United States Patent [19]

Murphy et al.

[11] Patent Number: 5,208,877
[45] Date of Patent: May 4, 1993

[54] FIBER OPTIC GRATING-BASED WEIGHTED, TWO-MODE FIBER SENSORS

[75] Inventors: Kent A. Murphy, Roanoke, Va.; Ashish Vengsarkar, Ashville, N.C.; Brian Fogg; Jonathan Greene, both of Blacksburg, Va.; Richard O. Claus, Christiansburg, Va.

[73] Assignees: Center for Innovative Technology, Herndon; VPI&SU, Blacksburg, both of Va.

[21] Appl. No.: 751,737

[22] Filed: Aug. 29, 1991

[51] Int. Cl.$^5$ ............................ G02B 6/26; H01J 5/16
[52] U.S. Cl. ........................................ 385/12; 385/13; 385/28; 250/227.14
[58] Field of Search ............... 250/227.14–227.19; 385/1, 12, 13, 27, 28, 37

[56] References Cited

U.S. PATENT DOCUMENTS

| | | | |
|---|---|---|---|
| 4,915,468 | 4/1990 | Kim et al. | 385/28 |
| 4,996,419 | 2/1991 | Morey | 250/227.18 |

OTHER PUBLICATIONS

K. O. Hill et al., Photosensitivity in optical fiber waveguides: Application to reflection filter fabrication, Appl. Phys. Lett. 32(10), May 15, 1978, pp. 647–649.
B. S. Kawasaki et al., Narrow-band Bragg reflectors in optical fibers, Optics Letters, vol. 3, No. 2, Aug. 1978, pp. 66–68.
G. Meltz et al., Formation of Bragg gratings in optical fibers by a transverse holographic method, Optics Letters, vol. 14, No. 15, Aug., 1989, pp. 823–825.
H. G. Park et al., Intermodal Coupler Using Permanently Photoinduced Grating In Two-Mode Optical Fibre, Electronics Letters, vol. 25, No. 12, Jun. 1989, pp. 797–798.
H. G. Park et al., All-optical intermodal switch using periodic coupling in a two-mode waveguide, optics Letters, vol. 14, No. 16, Optical Society of America, May 1989, pp. 877–879.
Francis Ouellette, All-fiber filter for efficient dispersion compensation, Optics Letters, vol. 16, No. 5, Optical Society of America, Dec. 1990, pp. 303–305.
John E. Sipe et al., Photosensitive optical fibers used as vibration sensors, Optics Letters, vol. 15, No. 7, Apr. 1990, pp. 399–401.
B. Y. Kim et al., Use of highly elliptical core fibers for two–mode fiber devices, Optics Letters, vol. 12, No. 9, Sep. 1987, pp. 729–731.
J. N. Blake et al., Strain effects on highly elliptical core two-mode fibers, Optics Letters, vol. 12, No. 9, Sep. 1987, pp. 723–734.
Kent A. Murphy et al., Elliptical-Core Two-Mode Optical-Fiber Sensor Implementation Methods, Journal of Lightwave Technology, vol. 8, No. 11, Nov. 1990, pp. 1688–1696.
D. Gloge, Weakly Guiding Fibers, Applied Optics, vol. 10, No. 10, Oct. 1971, pp. 2252–2257.
Shawn E. Burke et al., Distributed transducers, collocation, and smart structural control, Electro-Optical Materials, SPIE vol. 1307, 1990, pp. 211–221.
C. K. Lee et al., Modal Sensors/Actuators, Transactions of the ASME, Journal of Applied Mechanics, vol. 57, Jun. 1990, pp. 434–441.

*Primary Examiner*—Akm E. Ullah
*Attorney, Agent, or Firm*—Whitham & Marhoefer

[57] ABSTRACT

Two-mode, elliptical-core optic fibers with a permanent photo-induced index change are used as sensors with sensitivity varying as a function of length. The optic fiber sensors act as vibrational-mode filters thereby performing initial signal processing of the sensor signal. The sensors are based on photo-induced refractive index changes. These refractive index changes affect the differential phase modulation between the $LP_{01}$ and the $LP_{11}^{even}$ modes. The change in beat-length is dependent on the amount of strain induced in the fiber while the grating is being formed. The pattern is thus varied along the length of the fiber by straining the fiber in a specific fashion while the grating is being written. This changes the sensitivity, of the sensor along its length. By choosing an appropriate weighting function in the manufacture of the sensor, it is possible to implement vibrational-mode analysis, vibrational-mode filtering and other functions that are critical in control system applications.

4 Claims, 10 Drawing Sheets

FIBER OPTIC GRATING-BASED WEIGHTED, TWO-MODE FIBER SENSORS

CROSS-REFERENCE TO RELATED APPLICATION

This application is related in subject matter to co-pending application Ser. No. 07/751,738 filed concurrently herewith by Kent A. Murphy, Ashish Vengsarkar, Michael F. Gunther, Brian Fogg, and Richard O. Claus for "Spatially-Weighted Two-Mode Optical Fiber Sensors" and assigned to a common assignee. The disclosure of application Ser. No. 07/751,738 is incorporated herein by reference.

DESCRIPTION

Background of the Invention

1. Field of the Invention

The present invention generally relates fiber optic sensors for vibration analysis and, more particularly, to a fiber optic sensor based on the photosensitivity of fiber cores which allows for a weighted/distributed measurement along its length.

2. Description of the Prior Art

So-called Hill gratings were first formed in optical fibers in 1978 by sustained exposure of germanosilicate fibers to a standing interference pattern resulting from two counter-propagating beams within the core. See K. O. Hill, Y. Fujii, D. C. Johnson, and B. S. Kawasaki, "Photosensitivity in Optical Fiber Waveguides: Application to Reflection Filter Fabrication", *Appl. Phys. Lett.* 32, 647 (1978), and B. S. Kawasaki, K. O. Hill, D. C. Johnson, and Y. Fujii, "Narrow-band Bragg Reflectors in Optical Fibers", *Opt. Lett.* 3, 66 (1978). G. Meltz, W. W. Morey and W. H. Glenn in "Formation of Bragg Gratings in Optical Fibers by a Transverse Holographic Method", *Opt. Lett.* 14, 823 (1989), subsequently showed that Bragg gratings could be formed in germanium-doped fibers by exposing the core through the side of the cladding by using a transverse holographic method. Permanent index gratings in two-mode, elliptical-core optical fibers have been demonstrated, and several applications, such as their use in intermodal switching and chirped filters for dispersion compensation have been proposed. See H. G. Park and B. Y. Kim, "Intermodal Coupler Using Permanently Photoinduced Grating in Two-mode Optical Fibre", *Electron. Lett.* 25, 797 (1989), H. G. Park, S. Y. Huang and B. Y. Kim, "All-optical Intermodal Switch Using Periodic Coupling in a Two-mode Waveguide", *Opt. Lett.* 14, 877 (1989), and F. Oulett, "All-fiber Filter for Efficient Dispersion Compensation", *Opt. Lett.* 16, 303 (1991).

Bragg gratings in single-mode fibers have been used as vibration sensors as described, for example, by S. LaRochelle, V. Mizrahi, K. D. Simmons, g. Stegeman, and J. Sipe in "Photosensitive Optical Fibers Used as Vibration Sensors", *Opt. Lett.* 15, 399 (1990). Bragg gratings in single-mode fibers have also been used as strain and temperature sensors. See, for example, W. W. Morey, G. Meltz and W. H. Glenn, "In-fiber Bragg-Grating Sensors", *Proc. Optical Fiber Sensors Conf.*, p. 163 (1988).

A new class of sensors that uses two-mode fibers has been recently developed. See B. Y. Kim, J. N. Blake, S. Y. Huang, and H. J. Shaw, "Use of Highly Elliptical Core Fibers for Two-mode Fiber Devices", *Opt. Lett.* 12, 729 (1987), J. N. Blake, S. Y. Huang, B. Y. Kim, and H. J. Shaw, "Strain Effects on Highly Elliptical Core Two-mode Fibers", *Opt. Lett.* 12, 732 (1987), and K. A. Murphy, M. S. Miller, A. M. Vengsarkar, and R. O. Claus, "Elliptical-Core Two-Mode Optical-Fiber Sensor Implementation Methods", *IEEE J. Lightwave Technol.* 8, 1688 (1990). These sensors operate on the principle of differential phase modulation between the $LP_{01}$ and $LP_{11}{}^{even}$ modes in an elliptical-core, two-mode fiber. As the two modes propagate through the length of the fiber, an interaction between the symmetrical $LP_{01}$ mode and the asymmetrical $LP_{11}$ mode leads to a spatially alternating two-lobe pattern that evolves along the longitudinal direction.

Also known in the prior art is a distributed multiplexed optical fiber sensor described in U.S. Pat. No. 4,996,419 to Morey. The sensor according to Morey is an elongated single mode optical fiber having a multitude of separate and distinct longitudinally spaced Bragg sensing gratings of substantially identical initial periodicity. Light echoes are allocated to respective sensing gratings on the bais of time intervals elapsed, and these echoes provide information related to stresses applied to the respective sensing gratings. The Morey sensor provides a plurality of individual sensors which are spatially distributed allowing sensing of stresses at a plurality of different locations.

What is needed for optimal control architectures are variable sensitivity, spatially distributed transducers. Such transducers would be capable of picking up information selectively along its length and would have applications in the aerospace, high temperature chemical process, and mining industries, among others. For example, sensors of this type could be used in vibration suppression in a variety of machinery.

SUMMARY OF THE INVENTION

It is therefore an object of the present invention to provide a two-mode, elliptical-core optic fiber with a permanent photo-induced index change for use as a sensor with sensitivity varying as a function of length.

It is another object of the invention to provide optic fiber sensors for weighted/distributed applications wherein the sensor acts as a vibrational-mode filter thereby performing initial signal processing of the sensor signal.

According to the invention, a new type of vibration sensor based on two-mode optic fibers is provided. These sensors are based on photo-induced refractive index changes in two-mode, elliptical-core optical fibers. These refractive index changes affect the differential phase modulation between the $LP_{01}$ and the $LP_{11}{}^{even}$ modes. The change in beat-length is dependent on the amount of strain induced in the fiber while the grating is being formed.

In a specific embodiment, permanent gratings are written within germania-doped optical fiber cores. The grating pattern resembles the evolution of the two-lobe pattern along the length of the beam. This pattern is varied along the length of the fiber by straining the fiber in a specific fashion while the grating is being written. This changes the sensitivity of the sensor along its length.

By choosing an appropriate weighting function in the manufacture of the sensor, it is possible to implement vibrational-mode analysis, vibrational-mode filtering and other functions that are critical in control system applications. The invention provides a sensor which acts as a vibrational-mode filter when the weighting function is selected to be one. This tailoring of the sensor to specific applications allows the sensor to play the role of both transducer and signal processing element.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Introduction

Figure 1A:
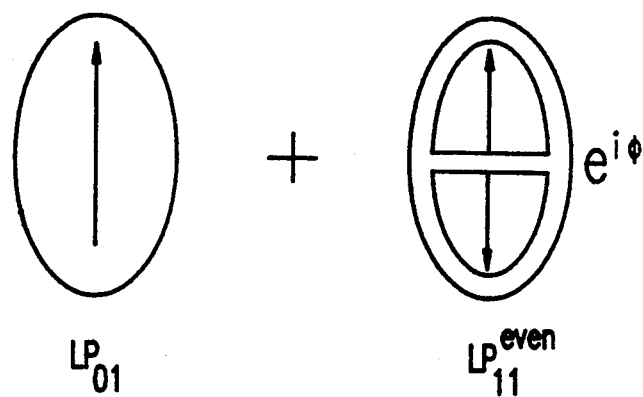
FIG. 1A are schematic cross-sectional views of a two-mode elliptical optic fiber showing the evolution of the $LP_{01}$ and $LP_{11}^{even}$ modes.
Figure 1B:
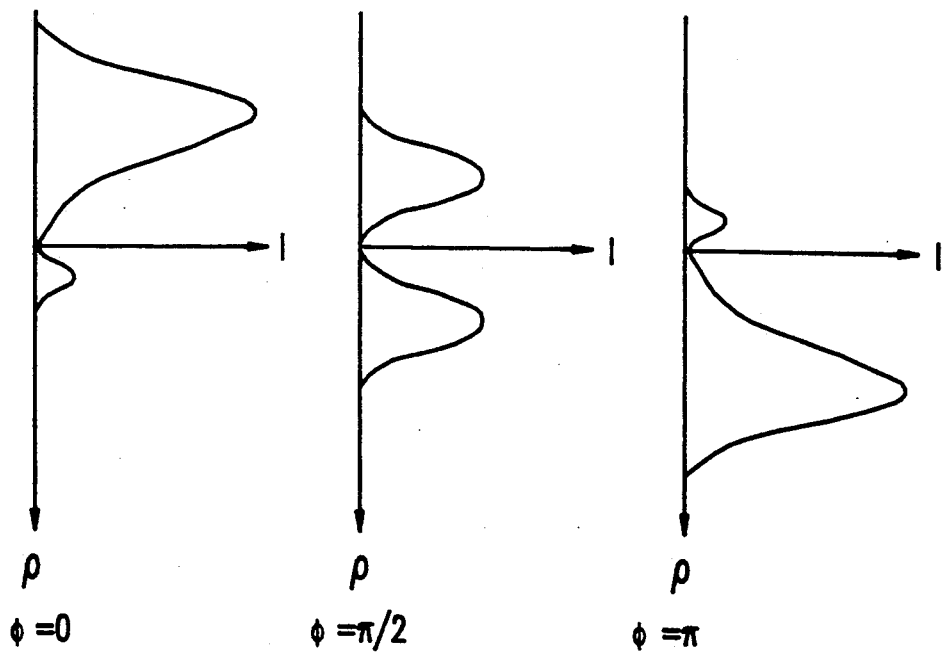
FIG. 1B are graphs showing the phase differences between the two modes illustrated by the schematic cross-sectional views of FIG. 1A.

Referring now to the drawings, and more particularly to FIG. 1A, there is shown schematic cross-sectional views of a two-mode elliptical optic fiber illustrating the evolution of the $LP_{01}$ and $LP_{11}^{even}$ modes. The phase difference $\phi$ between the $LP_{01}$ and $LP_{11}^{even}$ modes, as shown in FIG. 1B, is given by $\phi = \Delta\beta \, z$, where $\Delta\beta = \beta_{01} - \beta_{11}$ is the difference in the respective propagation constants. As the fiber is strained due to an external perturbation, the two-lobe pattern observed in the far-field changes and the two lobes exchange power. Monitoring one of the lobes and measuring the amount of elongation required for one complete sinusoidal oscillation of the power is the first step in the calibration of a sensor based on this principle.

Writing the Grating

Figure 2A:
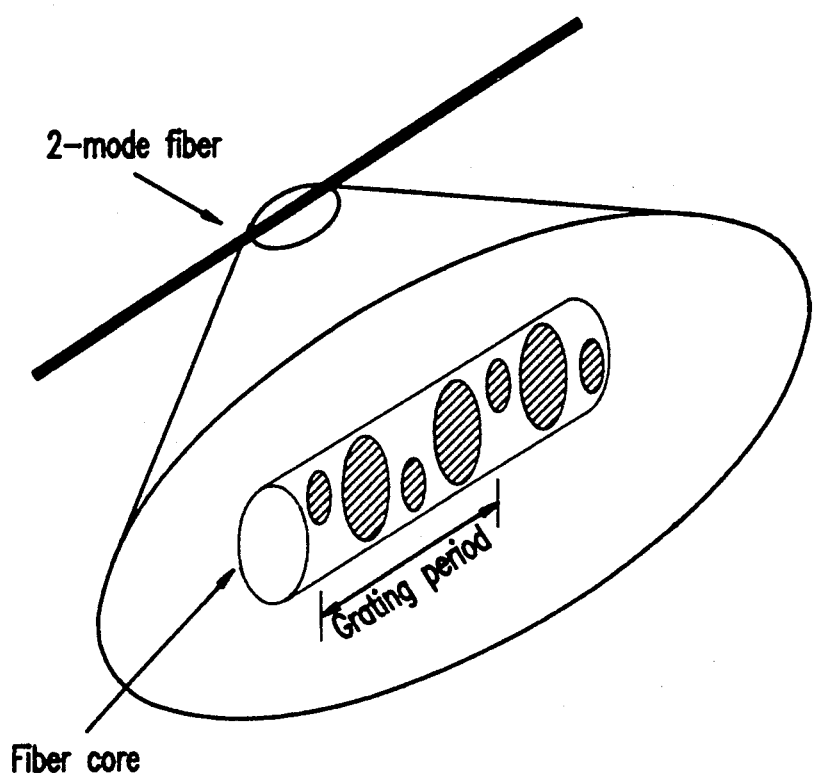
FIG. 2A is an isometric view of an optic fiber with an enlarged sectional view showing photo-induced refractive-index changes in a two-mode fiber.

The process of writing the grating within the fiber will now be described. When a high-intensity Argon-ion laser beam ($\lambda = 514.5$ nm) is launched into a germanosilicated, elliptical-core, two-mode fiber such that both modes are excited equally, a permanent refractive-index change is created due to the photosensitivity of the germanium-doped core with the same profile and periodicity as the two-lobe pattern as shown in FIG. 2A. such a two-mode fiber, with a permanent grating induced within its core, can no longer be described in terms of the original waveguide equations.

Figure 2B:
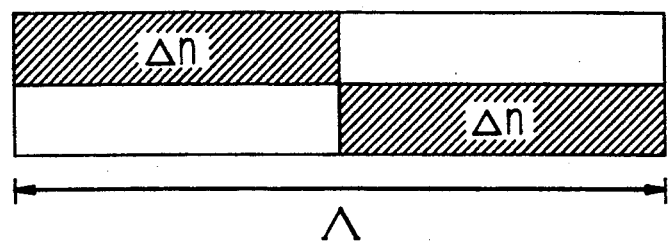
FIG. 2B is a block diagram showing a simplified model for theoretical analysis.

In the theory presented below, recourse is taken to the weakly-guiding approximations described by D. Gloge in "Weakly Guiding Fibers", *Appl. Opt.* 10, 2442 (1971), as applied to a circular waveguide, and the results are combined with conventional coupled-mode theory as described by D. Marcuse in Chapter 3 of *Theory of Dielectric Optical Waveguides*, Academic Press, New York (1991). This leads to a simplification of the resulting expressions, maintains analytical tractability and yet provides a good physical understanding of the underlying processes. FIG. 2B shows the simplified model of the periodic index grating.

For a weakly-guiding, circular-core fiber, the modal field amplitude of the linearly polarized $LP_{lm}$ mode in the core region can be expressed in the cylindrical coordinate system as $$\psi_{lm}(r,t) = A_{lm}J_l(\kappa_{lm}\rho)\cos(l\phi)e^{j\beta_{lm}z}e^{(-j\omega t)}, \quad (1)$$

where $\kappa_{lm}^2 \omega^2 n_1^2/c^2 - \beta_{lm}^2$, $\omega$ is the angular frequency of operation, and $\beta_{lm}$ describes the longitudinal propagation constant of the mode. In Equation (1), Alm represents the amplitude term for the particular mode and depends on the excitation conditions. for an elliptical core fiber, the transverse field expression, given by $J_l(\kappa_{lm}\rho)\cos(l\phi)$ for circular core fibers, is expressed in terms of the Mathieu functions in an elliptical coordinate system. Assuming the simplified model shown in FIG. 2B, the slowly varying amplitudes of the $LP_{01}$ and $LP_{11}$ modes can be written as $$A_{01}(z) = e^{(i\frac{\delta z}{2})}\left(\cos\eta z - i\frac{\delta}{2\eta}\sin\eta z\right) \quad (2a)$$

and $$A_{11}(z) = -e^{(-i\frac{\delta z}{2})}\left(\frac{\gamma}{\eta}\sin\eta z\right), \quad (2b)$$

respectively, where $$\eta^2 = |\gamma|^2 + \left(\frac{\delta}{2}\right)^2, \quad (3a)$$

$$\gamma = \left(\frac{\omega\epsilon_0 n_{av}\Delta n}{\pi}\right)\int_0^a d\rho \int_0^\pi d\phi \psi_{01}\psi_{11}^*, \quad (3b)$$

and $$\delta = \Delta\beta - \frac{2\pi}{\Lambda} + (C_{01} - C_{11}). \quad (3c)$$

From Equations (2), it can be shown that the modes will exchange power with a spatial frequency of $2\eta$. If the beat-length, $L_B$, in a strain sensor is defined as the elongation required to induce a complete oscillation in one of the lobes at the output, then $L_B = 2\pi/\eta$.

Figure 3:
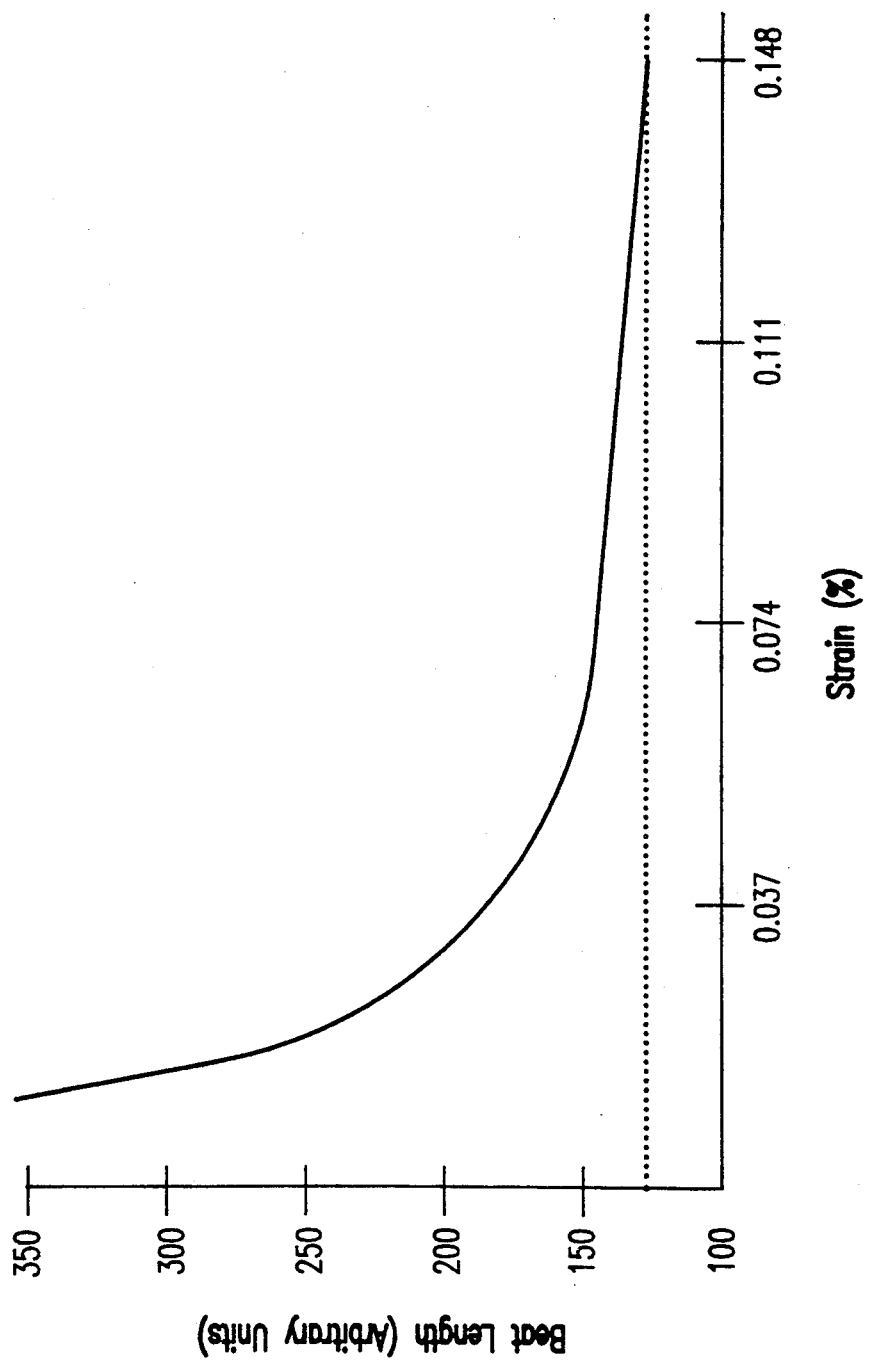
FIG. 3 is a graph of a theoretical plot of beat-length variation with induced strain.

Note that in a two-mode fiber without the induced refractive-index changes, $\gamma = 0$, $C_{lm} = 0$, and the beat-length is dependent (inversely proportional) only to $\Delta\beta$. Equations (3) imply that in a two-mode fiber grating, the beat-length, which determines the sensor sensitivity, is a function of the induced grating spatial frequency as well as the coupling coefficients. When a fiber with a permanent-index grating written in its core is strained, the grating period, $\Lambda$, will increase with increasing strain. The theoretical variation of the sensor beat-length as a function of the induced strain is shown in FIG. 3. The graph in FIG. 3 assumes that the strain is equally distributed along the length of the fiber and that the induced refractive-index change is on the order of $10^{-5}$. The plot indicates that as the fiber is strained, the successive beat-lengths should become smaller as the grating period moves away from its "resonance" condition with $\Delta\beta$. The horizontal dotted line on the plot represents the beat-length of the fiber before the grating was written. Exact values for the vertical axis in FIG. 3 can be calculated by knowing the original beat-length, the intensity of the incident optical power and the glass constants that govern the two-photon absorption process. The behavior of the beat-length with varying strain is important to this analysis. For very small amounts of strain ($\approx 0.1\%$) applied to the fiber, the effect of the grating becomes negligible and the beat-length of the two-mode fiber approaches its original value. The plot in FIG. 3 assumes that the fiber was unstrained when the grating was written. This implies that the grating spacing would match the differential phase-shift between the two modes in the unstrained state. If the fiber were held in a strained condition while being exposed to the high-intensity Argon-ion beam, one would expect that upon the release of tension, the grating formed would relax and posses a period somewhat less than the original two-lobe profile. During low-power probing of the grating, a differential-phase matching condition may then be obtained when the fiber is subjected to the same amount of strain as during exposure.

Experimental Results

Figure 4A:
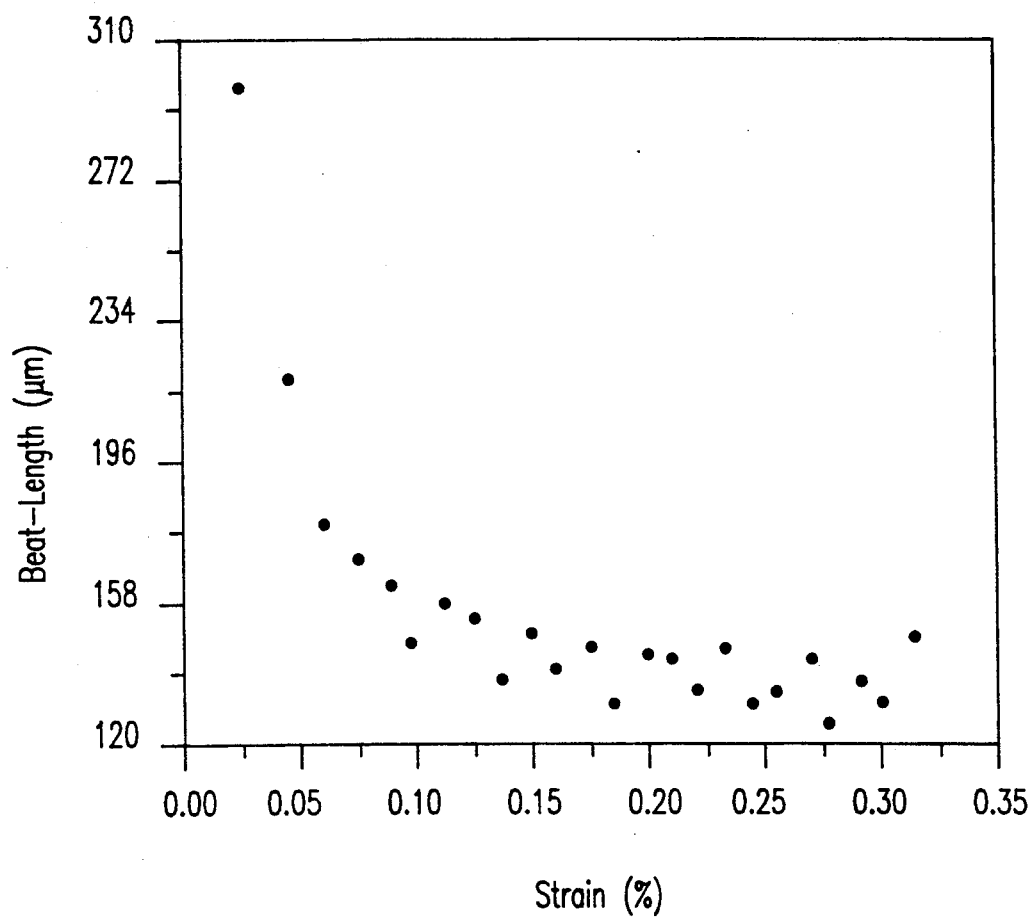
FIGS. 4A to 4D are graphs of experimental results showing the variation of beat-lengths with strain induced on an optic fiber with grating.
Figure 4B:
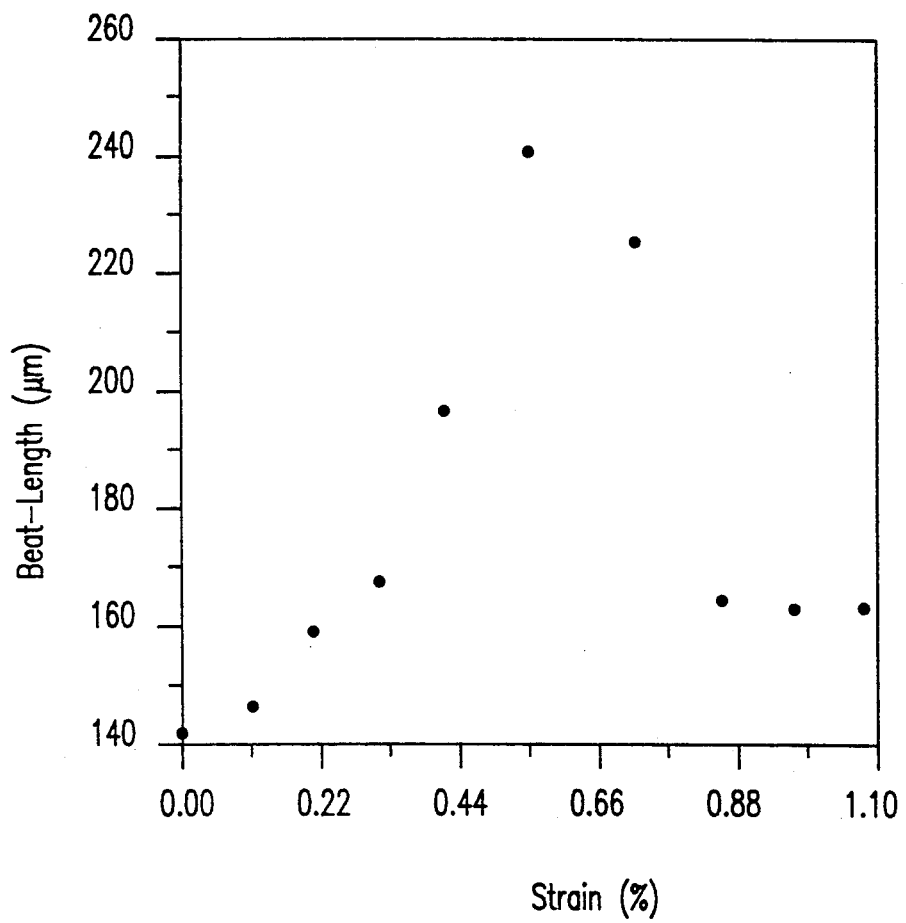
Figure 4C:
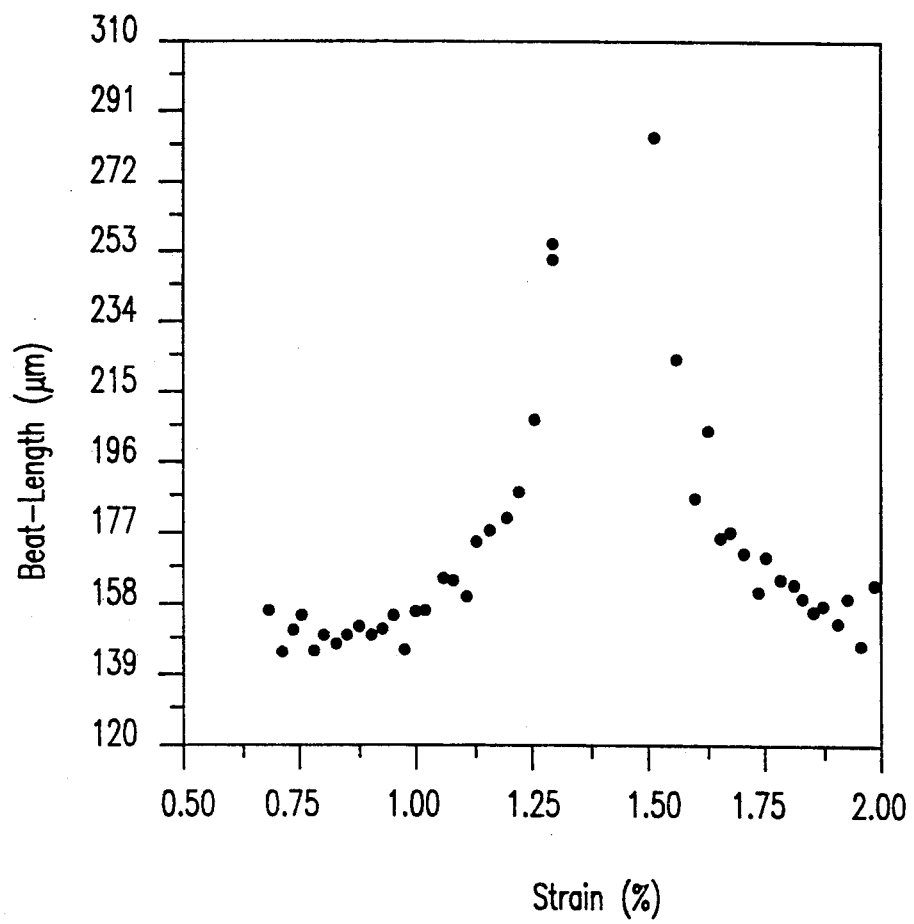
Figure 4D:
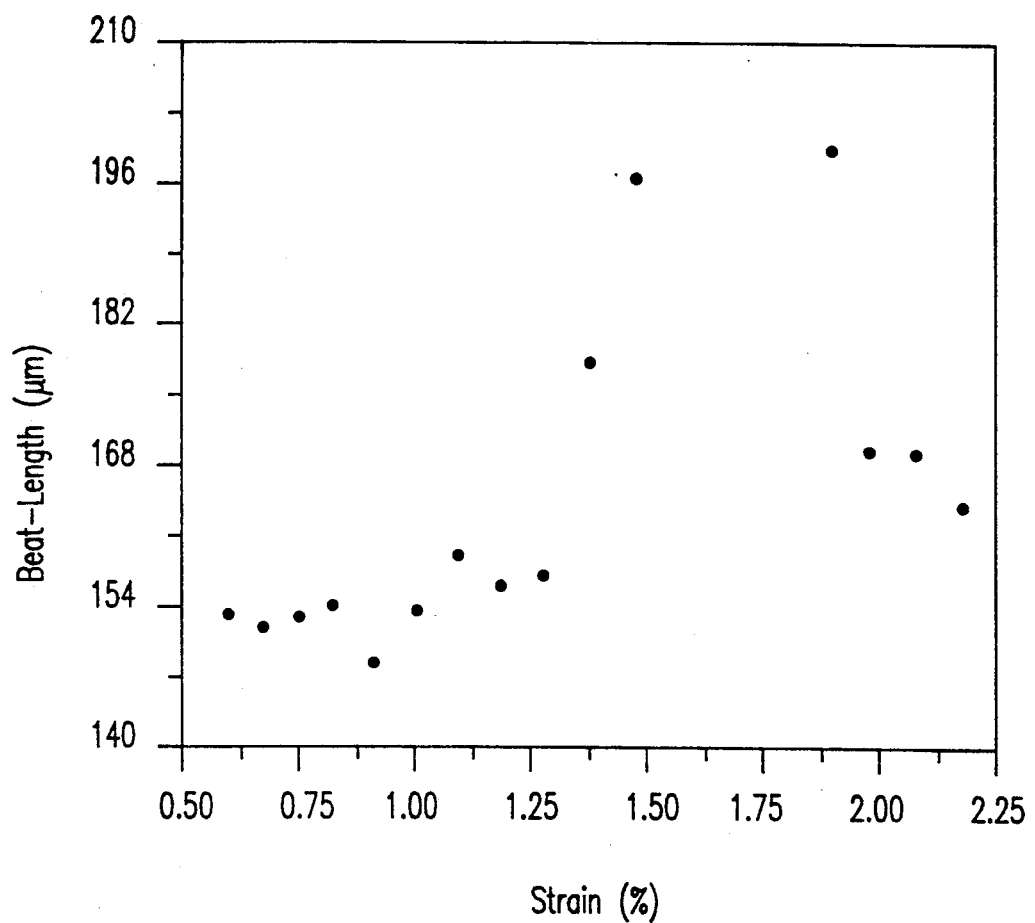

Experiments were performed on an elliptical-core fiber ($1.5 \times 2.5$ $\mu$m core dimensions) manufactured by Andrew Corporation with a single-mode cutoff wavelength of 628 nm. A linearly polarized Argon-ion laser beam (40 mW, 514.5 nm) was launched along the major axis of the Fiber and the germanium-doped core was exposed for approximately thirty minutes. The fiber was then probed with a low power (1 Mw, 514.5 nm), x-polarized optical beam and the beat-lengths were measured as a function of strain induced in the fiber. In FIG. 4A, the variation of the beat-length for a fiber that was kept unstrained during the writing process is shown. The gradual decline of the beat-length with increasing strain is clearly visible. For fibers that were held at constant strain levels of 0.7%, 1.4% and 1.8% while being exposed to the high power beam, resonant (differential phase matching between the grating spacing and $\Delta\beta$) conditions were observed at the corresponding strain levels, as shown in FIGS. 4B, 4C and 4D, respectively.

Application to Weighted Sensors

These results show that strained fibers exposed to high-power writing beams can be used as sensing elements with varying beat-lengths and varying sensitivities. An extension of this concept to weighted sensors makes this effect more significant. Current research in vibration sensing and control has shown that variable sensitivity, spatially distributed transducers may be more suitable than point sensors for optimal control architectures. See, for example, S. E. Burke and J. E. Hubbard, "Distributed Transducers, Collocation, and Smart Structural Control", *Proc. SPIE* 1307, 211 (1990), and C. -K. Lee and F. C. Moon, "Modal Sensors/Actuators", *J. Appl. Mechanics* 57, 434 (1990).

The subject invention builds on this experimental investigation to produce weighted fiber optic sensors to implement vibrational-mode analysis, vibrational-mode filtering and other functions that are critical in control system applications since the sensor itself plays the role of a signal-processing element. The sensor output for a two-mode, elliptical-core fiber sensor is sinusoidal and can be expressed as $$I(t) = I_0 + I_{ac} \cos[\phi(t)], \quad (5)$$

where $\phi$ is the phase difference between the $LP_{01}$ and $LP_{11}^{even}$ modes and can be written as $$\phi(t) = \Delta\beta \int_a^b p(x)\epsilon(x,t)dx, \quad (6)$$

where $\epsilon$ is the strain experienced by the fiber, $\Delta\beta$ is the difference in the propagation constants of the $LP_{01}$ and $LP_{11}^{even}$ modes, and a and b denote the two end-points of the two-mode sensing region of the fiber. In Equation (6), $p(x)$ is a weighting function that describes the sensitivity of the fiber sensor as a function of the length along the beam.

The key to the weighted sensing approach is that the vibration mode shapes of a beam are orthogonal, i.e., $$\int_0^L \psi_m(x)\psi_n(x)dx = \delta_{mn}, \quad (9)$$

where $\Psi_m$, $\Psi_n$ are the mth and nth mode shapes, respectively, $\delta_{mn}$ is the Kronecker delta, L is the length of the beam. This property is used in the design of the fiber-based vibrational-modal sensors.

The output signal from a two-mode fiber sensor is sinusoidal and can be expressed as $$I(t) = I_0 + I_{ac} \cos[\phi(t)]. \quad (10)$$

where $\phi$ is the phase difference between the $LP_{01}$ and $LP_{11}^{even}$ modes and can be written as $$\phi(t) = \int_a^b \Delta\beta(x)\epsilon(x,t)dx, \quad (11)$$

where $\epsilon$ is the strain experienced by the fiber, $\Delta\beta$ is the difference in the propagation constants of the $LP_{01}$ and the $LP_{11}^{even}$ modes, x denotes the longitudinal direction along the fiber axis, and a and b denote the two end-points of the two-mode sensing region of the fiber. In equation (11), the explicit dependence of $\Delta\beta$ on x implies that the strain sensitivity can be a function of the length along the beam.

In order to evaluate the vibration modes of the beam, the strain is expressed as $$\epsilon(x,t) = \frac{\partial^2 y(x,t)}{\partial x^2}, \quad (12)$$

where $y(x,t)$ denotes the deflection of the beam from its equilibrium point. To analyze a sensor fabricated from grating-based two-mode fibers, the differential propagation constant, $\Delta\beta$, should now be considered to be an explicit function of x. Substituting equation (12) into equation (11) and integrating by parts leads to the following equation:

$$\phi(t) = \eta_n(t)\left(Q(a,b) + \int_a^b \Delta\beta''(x)\psi_n(x)dx\right), \quad (14a)$$

where $$Q(a,b) = [\Delta\beta(x)\psi_n'(x)]_a^b - [\Delta\beta'(x)\psi_n(x)]_a^b, \quad (14b)$$

and the primes indicate spatial derivatives with respect to x. Comparing equations (14a) and (9) leads to the selection of a possible weighting function given by $\Delta\beta''(x) = \Psi_n(x)$. Except for the contributions of Q(a,b), $\phi(t)$ would filter out all but the mth mode for a fiber sensor spanning the entire length of the beam. Hence fairly mode-specific information can be acquired without resorting to conventional analog or digital post acquisition processing. The function Q(a,b) is essentially a constant once the fiber sensor has been attached to, or embedded in, the structure of interest. For a clamped-clamped beam, if the sensor guage length spans the entire beam, Q(a,b) is identically equal to zero irrespective of the weighting function.

Figure 5A:
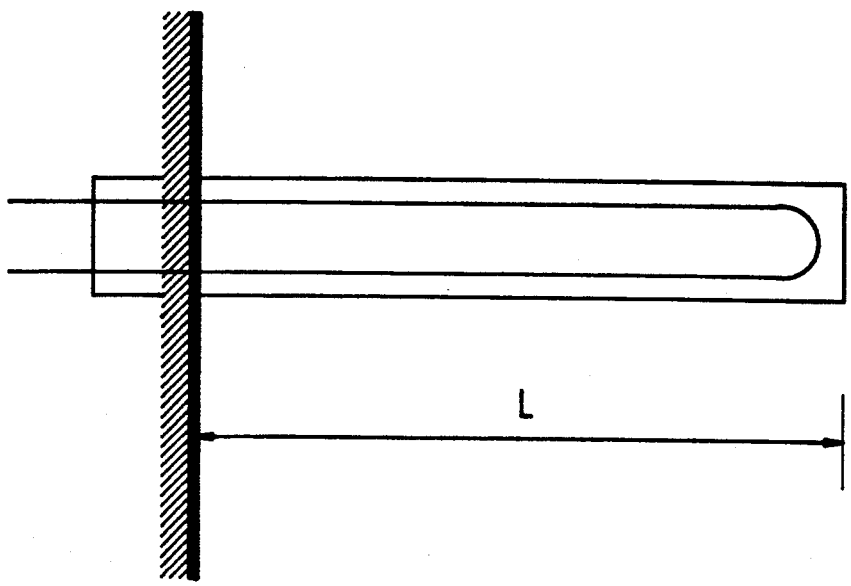
FIGS. 5A and 5B are respectively side and top views of a fiber attached to a beam while the grating is being written into the fiber.
Figure 5B:
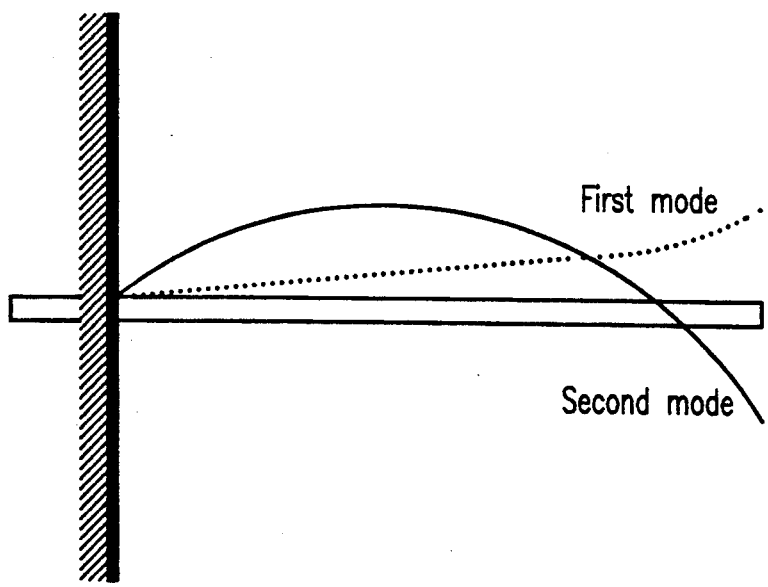

FIGS. 5A and 5B show side and top views, respectively, of the experimental setup for vibration sensing of one-dimensional beams in a clamped-free configuration. In FIG. 5A, a clamped-free beam 10 supports and optic fiber 12 which is attached to the beam. Hence, the fiber experiences the same strain as the beam. The length of the fiber is L. In FIG. 5B, the dotted line 14 represents the first mode of vibration of the optic fiber, while the solid line 16 represents the second mode of vibration.

Figure 6A:
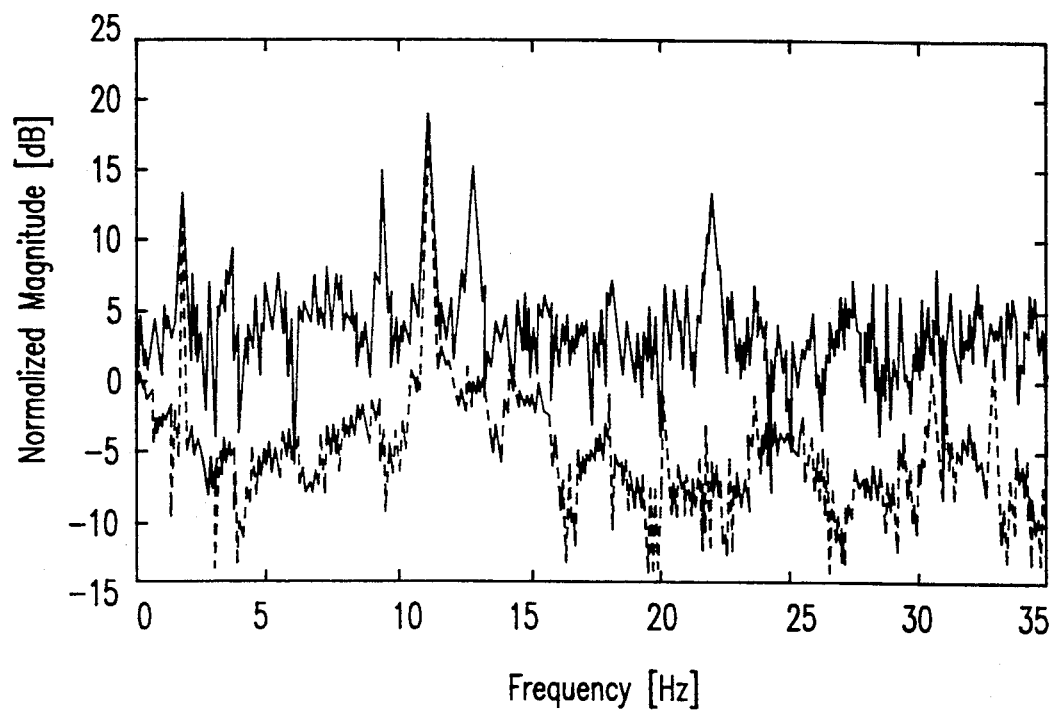
FIGS. 6A and 6B are graphs respectively showing fast Fourier transforms of stressed fiber optic sensors without and with weighting.

A conventional elliptical core sensor (i.e., without a grating written in the core) was first adhered to the clamped-free beam 10. Output signals from piezo-electric patches (not shown) attached to the beam were compared to the signals obtained from the fiber sensor. The first two modes of vibration of the beam were excited and the outputs from the fiber optic sensor and the piezo-electric patch were monitored. In FIG. 6A there is shown a fast Fourier transform (FET) of an oscilloscope waveform which shows that the sensor enhances the first mode of vibration in comparison with the piezo-electric sensor and picks up other modes of vibration fairly well, but with a reduced sensitivity of 2dB for the second mode.

Figure 6B:
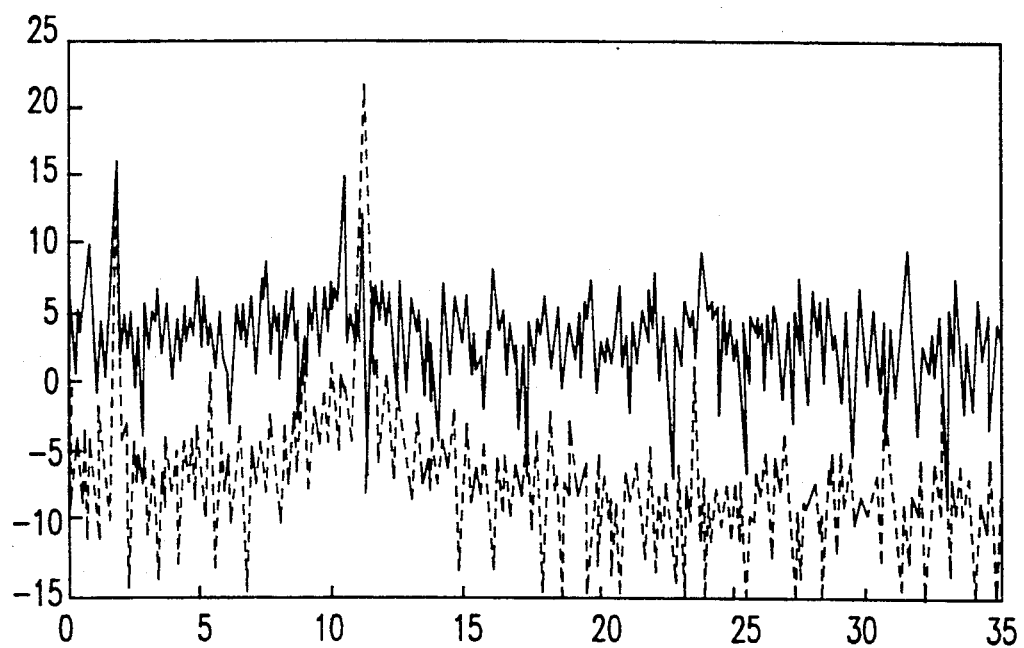

A weighted fiber sensor with grating that matches the $\Delta\beta''(x)$ function to the first mode of the clamped-free beam 10 was then built by exposing the fiber to a high power Argon laser. During the entire duration of the exposure, the beam 10 was displaced and held steady in the first mode of vibration. The weighted fiber was attached to the same clamped-free beam 10 as in the earlier experiment. The results obtained from the weighted fiber sensor obtained with low power probing are shown in FIG. 6B. The FETs of the fiber sensor and the piezo-electric patch show that the second mode has been suppressed by 7dB in comparison to the piezo-electric sensor output.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A two-mode, elliptical-core, vibration-modal optical fiber strain sensor with a permanent photo-induced index change forming a grating within the optical fiber characterized by a change in beat-length along the length of the optical fiber which is dependent on the amount of strain induced in the optical fiber while the grating is being formed, said grating being produced by differential phase modulation between $LP_{01}$ and $LP_{11}^{even}$ modes of laser light propagating in said optical fiber while the fiber is under stress, said optical fiber sensor exhibiting a strain sensitivity which is a function of distance along the length of the optical fiber.

2. The optical fiber sensor recited in claim 1 wherein strain sensitivity of the optical fiber is tailored to a specific transducer application according to a weighting function for the application.

3. A method of manufacturing a two-mode, elliptical-core, vibration-modal optical fiber sensor with a permanent photo-induced index change forming a grating within the optical fiber comprising the steps of:

mounting an elliptical-core optical fiber to a beam; and flexing said beam to induce a strain in the optical fiber while simultaneously exposing the fiber to a high power laser to form a grating within said optical fiber and producing a change in beat-length along the length of the optical fiber which is dependent on the amount of strain induced in the optical fiber while said grating is being formed.

4. The method recited in claim 3 further comprising the step of tailoring the sensor to a specific transducer application by selecting a weighting function for the application, said weighting function being a function of the strain induced in the optical fiber while said grating is being formed.

* * * * *